United States Patent [19]

Troost

[11] Patent Number: 4,488,292
[45] Date of Patent: Dec. 11, 1984

[54] PCM-TDM SWITCHING SYSTEM USING TIME SLOT MULTIPLES

[75] Inventor: Marcel A. Troost, Munich, Fed. Rep. of Germany

[73] Assignee: Siemens Aktiengesellschaft, Berlin & Munich, Fed. Rep. of Germany

[21] Appl. No.: 328,954

[22] Filed: Dec. 9, 1981

[30] Foreign Application Priority Data

Feb. 5, 1981 [DE] Fed. Rep. of Germany ....... 3104002

[51] Int. Cl.³ .............................................. H04J 3/00
[52] U.S. Cl. ...................................... 370/63; 370/68; 370/108
[58] Field of Search ..................... 370/66, 63, 68, 108, 370/105, 58, 100

[56] References Cited

U.S. PATENT DOCUMENTS

| | | | |
|---|---|---|---|
| 3,576,947 | 5/1971 | Kruger | 370/105 |
| 3,649,763 | 3/1972 | Thompson | 370/68 |
| 3,881,064 | 4/1975 | Schlichte | 179/15 AT |

FOREIGN PATENT DOCUMENTS

| | | |
|---|---|---|
| 2109038 | 9/1972 | Fed. Rep. of Germany . |
| 1275520 | 5/1972 | United Kingdom . |
| 1340268 | 12/1973 | United Kingdom . |

*Primary Examiner*—Douglas W. Olms
*Assistant Examiner*—Frank M. Scutch, III
*Attorney, Agent, or Firm*—Hill, Van Santen, Steadman & Simpson

[57] ABSTRACT

A line trunk group is connected by way of a compensating memory to an input and, in fact, to those of the time slot multiples of the PCM switching network. Uniform time slots of the pulse frame boundaries within the switching network are provided. However, in the last switching stage and, in fact, in time slot multiples, displacement of a pulse frame boundaries in the lines leading back to the trunk line groups is provided. In this manner, line trunk groups acquire the frame clock rate. This influences, in respect of time slots, the transmission of sub-items of information from the line trunk groups to the switching network with regard to pulse frames of these sub-items of information, i.e. the relevant time slot of the pulse frame boundaries. Cable transit time on lines from the switching network to the line terminal group and from the line terminal group to the switching network, and delaying influences within the line trunk group which result in partially constant and partially variable delay values, are compensated, in part, by the above-mentioned displacement and, in part, by storage in the compensating memory, which can be adapted in terms of storage time, and, in fact, by increasing the delay to a full pulse frame duration or in multiple thereof. Economy of storage capacity in the compensating memory is therefore provided.

3 Claims, 1 Drawing Figure

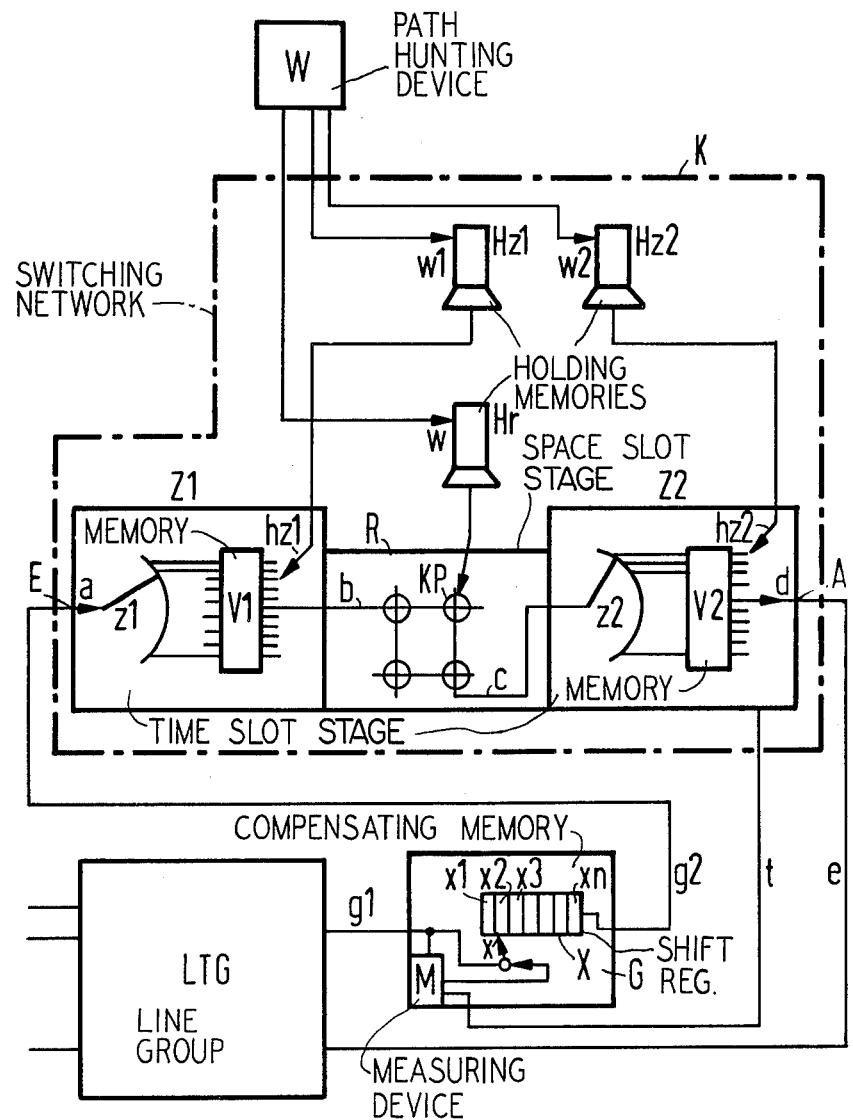

PCM-TDM SWITCHING SYSTEM USING TIME SLOT MULTIPLES

BACKGROUND OF THE INVENTION

1. Field of the Invention

The present invention relates to a circuit arrangement for time-division multiplex (TDM) telecommunications exchanges, in particular for pulse code modulation (PCM) telephone exchanges, wherein individual connections are, in each case, established via a pair of channels, the two individual channels of which serve to transmit communications relating to the connection in the one end and in the other direction of transmission, and with line trunk group (LTG) devices which are individually connected to the inputs of the multi-stage switching network and in which the two channels which are to be switched through across the switching network in accordance with the TDM principle and are each assigned to a connection exhibit synchronism in respect of time clock rate and pulse frame boundaries by virtue of the intermediate storage of the items of communication information to be transmitted in each of the two directions of transmission. The write-in processes and the read-out processes in the relevant full memories of these devices are brought into conformity with regard to the time sequence of the individual sub-items of information and with regard to the time position of the pulse frame boundaries of the pulse frames which serve to combine the sub-items of information scanning cycle-by-scanning cycle. Pairs of channels of this kind, which are switched-through on a TDM basis and which are each assigned to a connection are subject to delay influences in their course from one of the aforementioned devices across the switching network back to the same or to another of these devices which corresponds thereto and which operates in clock rate and pulse frame synchronism therewith. The delay influences relate to the time sequence of the individual sub-items of information and the time position of each of the pulse frame boundaries. Delay devices are provided by way of which the channels may be switched through on a TDM basis and which serve to implement an additional delay by which the sub-items of information which arrive via a channel of a pair of channels assigned to a connection from the switching network in the aforementioned device or the corresponding sub-items of information which are to be forwarded to the switching network via the other channel of the pair are brought into synchronism in respect of their time slots and the boundaries of their pulse frames, in order to assure the aforementioned synchronism.

2. Description of the Prior Art

Delay devices of the type mentioned above are known from the German Pat. No. 2,148,994. German Pat. No. 1,939,027, German Pat. No. 2,021,344 and German Pat. No. 2,109,038 are also concerned with the problem of so-called frame compensation which is discussed, for example, therein. Frame compensation is achieved with the aid of delay devices of the abovementioned type.

The delay devices comprise, for example, compensating memories, e.g. full memories into which sub-items of information arriving via the time channels of an incoming TDM line are written successfully in accordance with the correct time slot, and from which these sub-items of information are read in the sequence in which they were written following a storage time which corresponds to the desired delay, whereupon they are retransmitted by way of the outgoing TDM line connected to the compensating memory. Compensating memories of this kind can be designed so as to permit adjustment of their storage time. Consequently, their storage time may be adapted to existing requirements in respect of the prevailing operating situation. If, due to line influences or the like, sub-items of information arriving via a TDM line are affected by a delay of a specific delay time, the storage time and the compensating memory in question is designed to be such that the sum of delay time plus storage time is equal to the pulse frame duration—or a whole numbered multiple thereof—of the pulse frames in which the sub-items of information are transmitted via the TDM lines. In this manner, the boundaries of the pulse frames are shifted in time so that the boundaries of the pulse frames of the sub-items of information transmitted via various TDM lines coincide in time.

In switching networks of the type referred to above, and which are assumed to be known per se, switching network inputs are connected to so-called line trunk groups, which in the following will always be referred to with the abbreviation LTG (LTG being understood to be a terminal group for TDM connection lines or a terminal group for analog/digital and digital/analog converters and the like). The LTGs are likewise individually connected to switching network outputs. By way of the switching network inputs, the sub-items of information from the LTGs are transmitted in the direction of the switching network. By way of the switching network outputs, the sub-items of information transmitted via the switching network are forwarded in the direction of the LTGs. From the sub-items of information which are successively forwarded via the switching network outputs, in connection with pulse frames, and are received in the LTGs, the LTGs derive the operating clock rate which governs their internal switching functions, including the time slots of the pulse frame boundaries. On this basis, it is also possible to determine the time slots of the sub-items of information successively transmitted from the LTGs to the switching network internally within the pulse frames, including the time slots of the pulse frame boundaries of such pulse frames.

On the lines leading from the switching network to the LTGs, the sub-items of information transmitted across these lines are subject to line influences which result in a delay of the sub-items of information along the lines of the delay influences referred to above. In addition, the internal switching functions of the LTGs are affected by delay influences which result in a delay of the time slots of the sub-items of information transmitted from the LTGs to the switching network input in question in relation to the subitems of information transmitted from the switching network output to the LTG (operating clock rate derived from the switching network) including the time slots of the pulse frame boundaries. Finally, the sub-items of information transmitted from the LTGs to the switching network input in question are likewise subject to line influences, which again manifest as delays and can even result in a time shift of the appertaining pulse frame boundaries.

These delays which are thus produced at three stages can differ in magnitude depending upon the nature and the length of the lines concerned. Furthermore, the various LTGs can themselves exert different delay influences of the above-mentioned type. The delays caused by these factors and by the different line values remain constant while operation is in progress. Furthermore, however, in the LTGs, the device which serves to synchronize the LTG in question to the appertaining clock rate derived from the switching network (including time slots of the pulse frame boundaries) can be affected by a disturbance. Delays occurring in this manner within an LTG in respect of the sub-items of information transmitted from the LTG to the relevant switching network input in relation to the operating clock rate derived by the LTG from the sub-items of information transmitted from the relevant switching network output to the LTG, including the time slots of the pulse frame boundaries, therefore will not automatically remain constant while operation is in progress, but may not occur for a long period of time, or can occur at any time due to interference, and can also vary in magnitude during the course of operation.

SUMMARY OF THE INVENTION

The object of the present invention is to avoid the aforementioned delay influences which can derive from the construction of an exchange and/or from operating disturbances which, in themselves, are slight, e.g. with regard to the synchronization on the part of the LTG. This object is to be effected at the lowest possible expense and at the best possible exploitation of the required expense.

The above object is realized, according to the present invention, in that the time slot stages provided in the last switching stage transmit the received sub-items of information which have been intermediately stored in the full memory in question in pulse frames whose boundaries are displaced relative to the boundaries of the pulse frames of the sub-items of information received in the relevant time slot stage by a delay time whose duration is determined by the difference between the pulse frame duration, on the one hand, and, on the other hand, the sum of possible maximum values of those delays which are caused by line influences (cable transit time) on the path from the switching network output to the device in question and on the path from the device to the switching network input in question, and by influences, in particular interference influences, within the device. The compensating memories which are assigned to the inputs of the switching network and which intermediately store the sub-items of information received by one of the aforementioned devices pulse frame-by-pulse frame, including the pulse frame boundaries, retransmit the sub-items of information following a storage time which can be matched to the difference between the maximum value and the actual value of the aforementioned line influences and the aforementioned influences within the device in question.

Since the requisite storage capacity of compensating memories of this kind increases together with the storage time which such memories must provide, i.e. their requisite storage capacity may be the smaller, the shorter the requisite storage time, the invention can serve to reduce the total expense required for such storage in the compensating memories, resulting in an advantageous fundamental reduction in expense.

BRIEF DESCRIPTION OF THE DRAWING

Other objects, features and advantages of the invention, its organization, construction and operation will be best understood from the following detailed description of an exemplary embodiment of the invention, in conjunction with the accompanying drawing which has a single figure which is a schematic representation of the invention showing only those components which contribute to the explanation of the invention.

DESCRIPTION OF THE PREFERRED EMBODIMENTS

The following description is based on a multi-stage switching network which is designed for PCM connections and which consists partly of time stages and partly of space stages with which one skilled in the art will be widely familiar from many sources; for example, the German allowed and published application No. 2,108,745, corresponding to U.S. Pat. No. 3,790,713, and in particular FIG. 1 together with the description thereof, illustrates and describes a switching network of this kind. In place of a switching network including a switching stage comprising time slot stages (Z1), a switching stage comprising space slot stages (R), and a further switching stage comprising time slot stages (Z2), it is also possible to provide a switching network composed of more switching stages, partly consisting of further time slot stages and partly of further space slot stages. Before the description concentrates on the special features of the exemplary embodiment constructed in accordance with the invention, a general explanation will be given of the switching network K illustrated on the drawing.

Referring to the drawing, two time slot stages Z1 and Z2 and a space slot stage R of a switching network K have been shown. A TDM line incoming at a switching network input E of the switching network K is referenced a and a TDM line outgoing from a switching network output A is referenced d. TDM intermediate lines have been referenced b and c. These intermediate lines connect the time slot stage Z1 to an input of the space slot stage R, and further connect an output of the space slot stage R to the time slot stage Z2. In a known manner, the space slot stage R comprises crosspoints, of which one has been referenced KP.

The represented time slot stages and the space slot stage form part of a larger PCM-TDM switching arrangement. A connection is established in that, in a known manner, and using a path hunting device W, hunting and selection of a free connection path takes place which can be constructed across free connection channels of the TDM lines. In this respect, holding memories Hz1, Hz2 and Hr are provided. The holding memories Hz1 and Hz2 are individually assigned to the time slot stages Z1 and Z2. The holding memory Hr is assigned to the space slot stages R.

The aforementioned holding memories serve to store items of switching data which indicate the assignment of outgoing time channels to incoming time channels in each case within one of the aforementioned stages. This assignment corresponds to the switch-through data for a connection in a space division stage of a conventional type (input coordinate line number/output coordinate line number).

These items of switching data are determined in a known manner employing a path hunting device in respect of each connection on the basis of data which is stored in a seizure memory (earlier systems: path hunting network) relating to the status (free or busy) of all relevant parts of the switching network, mainly of the intermediate lines, in the form of information processing logic-linking procedures. These items of switching data clearly indicate the course of a connection which is to be switched through or is switched through across the multi-stage switching network, with regard to the intermediate lines and cross points and to the TDM lines, time channels, time slots, etc. which are to be used. Also, in the present example, path hunting processes of this kind take place in respect of each connection which is to be switched through. If it is not a question of a single channel connection, but of a multi-channel connection, a plurality of such path hunting processes can be carried out individually for the plurality of connection establishment processes required.

When they relate to a connection extending across the relevant TDM switching arrangement, the items of switching data determined by means of the path hunting processes are stored in the holding memories of the time slot stages and the space slot stages. In the case of the time slot stages, the storage positions of the particular assigned holding memory are permanently assigned to the channel numbers of the outgoing time channels. The connection-individual sub-items of information which arrive via the incoming time channels of a PCM-TDM line in respect of each pulse frame are cyclically recorded in the full memory, e.g. V1, assigned to the time slot stage in question, e.g. Z1. In contrast, the read-out operation, whereby these sub-items of information are individually forwarded via the outgoing time channels, takes place in accordance with the items of switching data which indicate the assignment of the outgoing time channels to the incoming time channels and in respect of each outgoing time channel are stored in storage positions within the holding memory in the form of storage position addresses of the full memories. Therefore, in respect of each outgoing time channel, the holding memory indicates, in a storage position permanently assigned to the outgoing time channel, under which full memory storage position address the sub-items of information to be forwarded via the time channel is entered, i.e. is intermediately stored.

As explained above, the storage positions of the holding memory are permanently assigned to the time channels of an outgoing TDM line. Consequently, in order that the intermediately-stored sub-items of information may be forwarded from the full memory, the storage positions of the holding memory are cyclically operated in accordance with the time slots of the outgoing time channels.

The aforementioned cyclic write-in of the sub-items of information arriving via a TDM line, e.g. a, c, incoming into a PCM time slot stage, e.g. Z1, Z2, into the full memory, e.g. V1, V2, of the time slot stage in question is carried out with the aid of a control write-in device, e.g. z1, z2. Therefore, the control write-in device of a time slot multiple is continuously stepped on in order that this cyclic write-in process may take place.

The reading of the information to be forwarded via a TDM line, e.g. b, d, leading out from a PCM time slot stage, e.g. Z1, Z2, takes place with the aid of a relevant holding memory. The holding memories Hz1, Hz2 are assigned to the two time slot stages Z1 and Z2. The time slots of the individual time channels of the PCM-TDM lines b and d outgoing from the time slot stages Z1 and Z2 are permanently assigned to the storage positions of the holding memories Hz1 and Hz2. The storage positions of the holding memories are cyclically operated in a manner which is known per se and which is therefore not been represented on the drawing.

In the present example, the assignment of the holding memory positions of the holding memories Hz1 and Hz2 to the time slots of the time channels of the TDM lines b and d is thus designed to be such that consecutive storage positions in the holding memories Hz1 and Hz2 are assigned to the time channels of each of the two TDM lines progressively from storage position-to-storage position in the sequence of the time slots. In the event of cyclic reading, of the storage position addresses of the full memories V1 and V2 stored in the holding memories Hz1 and Hz2, full memory position addresses of the one and of the other of these two full memories are therefore successively output. The full memory storage position addresses of the full memory V1 serve to control its control reading device hz1 in a known manner. The full memory storage position addresses of the full memory V2 are likewise used to control its control reading device hz2. Since, in the holding memories, the items of switching data stored in respect of each outgoing TDM line b and d indicate the assignment between a time channel on the outgoing TDM line and a time channel on the incoming TDM line, the described control of the control reading devices hz1 and hz2 determines the incoming time channel from which emanates the particular sub-items of information which is to be transmitted via the outgoing time channel which is the next in turn to transmit the sub-items of information in question in accordance with the cyclic reading process of the holding memories Hz1 and Hz2 in the given time slot.

The control of the space slot stage R with the aid of the holding memories Hr does not constitute the subject matter of the present invention. The control processes in question take place in a known manner, with regard to which reference is made to the aforementioned German published application 2,108,745, corresponding to U.S. Pat. No. 3,790,713.

In the case of the time slot stages Z1 and Z2, the writing and reading processes in the full memories V1 and V2 can be carried out continuously in a known manner. As explained, the write-in operation which serves to record the individual sub-items of information individually in respect of each incoming time channel in storage positions within the full memory, takes place cyclically, whereas the read-out operation which serves to forward the sub-items of information individually via the outgoing time channels is carried out in accordance with the switching data which indicates the assignment of the outgoing time channels to the incoming time channels and is stored in respect of each outgoing time channel in storage positions within the holding memory Hz in the form of storage position addresses of the full memories V1 and V2. In contrast, this assignment can also be provided in the reverse fashion. This would mean that the write-in operation is carried out in accordance with the aforementioned items of switching data and the read-out operation is carried out cyclically. This alternative is described in detail and the above-mentioned German allowed and published application No. 1,108,745.

The holding memories Hz1 and Hz2 possess not only a memory having a number of storage positions corresponding to the number of full memory position addresses to be stored for the two full memories V1 and V2, but a control right-in device w1 and w2 and a control read-out device hz1 and hz2. By way of the control write-in device the items of switching data determined by the path hunting device W are entered into the holding memory Hz. With the aid of the control read-out device out of the holding memory Hz, these items of switching data are read from the storage positions of the holding memory in the described manner.

This general description of the switching network K and the functions thereof will now be followed by detailed consideration of the special features provided by the present invention.

Individual connections are established by means of a pair of channels, the two individual channels of which serve to transmit items of communication relating to the connection in the one direction and in the other direction of transmission. The inputs, e.g. E of the individual switching network K are individually connected via TDM lines, e.g. the TDM line g1/g2, to terminal groups, e.g. the terminal group LTG (line trunk group). A line trunk group of this kind can be connected at its input to subscriber lines (analog), analog connection lines and PCM connection lines. A line trunk group contains coders, decoders, multiplexers, demultiplexers and the devices required to carry out the so-called BORSCHT functions (see NTZ, Edition 33/1980, Vol. 10, pp. 646–652 and 1978 International Zurich Seminar on Digital Communications, Proceedings IEEE Catalog No. 78 CH 1325-0 ASST pp. B2.1, A4.1). These line trunk groups represent the devices LTG which are individually connected to the inputs of the multi-stage switching network K and in which the two channels which are to be switched through across the switching network in accordance with the TDM principle and are each assigned to a connection exhibit synchronism in respect of time clock rate and pulse frame boundaries by the intermediate storage of the items of communication information to be transmitted in each of the two directions of transmission. For this purpose, an intermediate storage of the items of PCM information is provided for each connection in respect of the aforementioned coding and decoding and in respect of the multiplexers and demultiplexers. In the case of connection to PCM connection lines which lead to or from other exchanges, it is possible to provide compensating memories for frame compensation with regard to the data transmission via these PCM connection lines in the line trunk groups. Therefore, the line trunk groups can contain all of the previously-mentioned switching devices required for the connection of the above-mentioned lines (on the drawing on the left of the device LTG) or only those required for the particular function.

Advantageously, the line trunk groups are equipped with full memories. The write-in and read-out processes in the full memories in question of each of these line trunk groups are brought into conformity with respect to the time sequence of the individual sub-items of information and with regard to the time position of the boundaries of the pulse frames which combine the sub-items of information scanning cycle-by-scanning cycle. Therefore, this relates to two channels which are assigned to a connection and which relate to different directions of transmission within a line trunk group.

These two channels assigned to a connection extend from a line trunk group across the switching network, back to the same line trunk group, or to another similar line trunk group operating in synchronism therewith in respect of clock rate and pulse frames. From a line trunk group a TDM line g1/g2 leads to an input E of the switching network. From the output A of the switching network a TDM line e leads to the same line trunk group. Considered from here, this line trunk group is therefore connected to the switching network by means of a TDM line which is outgoing in respect of the information transmission direction and a TDM line which is incoming in this respect. As regards the two channels which are assigned to a connection and serve for one direction of transmission (e.g. from the calling subscriber to the call subscriber) and the other direction of transmission (e.g. from the called subscriber to the calling subscriber), one channel (considered in the direction from the calling subscriber to the called subscriber) extends across the line trunk group LTG, across the TDM line g1/g2, across the switching network K, across the TDM line e, and once more across the line trunk group LTG. The other of these two channels (likewise considered in the direction from the calling subscriber to the called subscriber) and which therefore is assigned to the opposite direction of transmission, extends from the line trunk group LTG across the TDM line e, the switching network K, the TDM line g2/g1, and again across the line trunk group LTG; therefore, the course of the second of the two channels is represented backwards in respect to the direction of transmission.

As regards the clock pulse supply, the line trunk group LTG is controlled in dependence upon the switching network K and, in fact, in dependence upon control devices of the switching network which have not been represented in detail. For example, for the handling of write-in and read-out processes in the full memories, these control devices supply an endless sequence of clock pulses in accordance with which the transmission of the sub-items of data from the time slot multiple Z2 via the TDM line e to the line trunk group LTG is handled. From here, the sub-items of data are further transmitted via the channels of a connected TDM line or—following conversion—via individual connection lines (in analog fashion), or else a corresponding conversion takes place in the event of connections to subscriber connection lines in a known manner (analog).

From the sequence of sub-items of information transmitted from the time slot multiple Z2 to the line trunk group LTG in connection with pulse frames, this line trunk group recognizes the continuously recurring frame mark bit which marks the time slot of the boundaries of these pulse frames. In this manner, the line trunk group obtains not only the pulse frame which governs the handling of its operating processes, but also the time slot of the pulse frame boundaries; this, in turn, governs both the forwarding of the aforementioned sub-items of information from the line trunk group LTG via the lines connected thereto (channels of a connected TDM line or analog connection lines or subscriber lines, again analog) and likewise the reception of sub-items of information in the opposite direction. Therefore, the latter sub-items of information are those which are to be forwarded via the TDM line g1/g2 to the switching network K. In the line trunk group LTG, these sub-items of information arrive via the second channel of the TDM line which is being used for the connections in question, or else analog signals arrive which are first converted into corresponding sub-items of information (PCM signals) in the line terminal group LTG.

The sub-items of information to be transmitted from the LTG to the switching network K via the TDM line g1/g2 are now governed not only by the clock rate of the sub-items of information which are transmitted via the TDM line e to the line trunk group LTG, but also that the time slot of their pulse frame boundaries, that is the time slot of the frame mark bits, and, in fact, in respect of the time slot of the pulse frame boundaries of the sub-items of information transmitted from the line trunk group LTG via the TDM line groups g1/g2 to the time slot stage Z1 of the switching network K. Although the time slot stages of the various switching stages can be operated in such a manner that their pulse frame boundaries coincide in time, a delay, due to line influences on the TDM lines (cable transit times) will nevertheless occur on the TDM lines g1/g2, and e. Spatially, the switching network itself is of enclosed construction. On the other hand, the TDM lines g1/g2 extend across varying distances within the exchange in question. This results in differing magnitudes of delay on the various TDM lines between the switching network K and the various line trunk groups LTG. At this point, as an introduction to the remainder of the description, it should be mentioned that the TDM line group g1/g2 extends across a compensating memory G. If the compensatin memory G is integrated into the switching network K, or indirectly attached thereto, as regards the TDM line g1/g2, that part referenced g2 on the drawing is correspondingly shortened or becomes a TDM intermediate line (internal to the switching network) so that the line influences arise fundamentally only from that part of the TDM line reference g1.

The aforementioned compensating memory comprises a delay device by way of which the channels may be switched through on a TDM basis, and which serves to produce an additional delay. Furthermore, the line trunk group LTG exhibits an internal delay with regard to the time difference between the time slot of the frame mark word which has been received (via the line e) and the time slot of the frame mark word which has been transmitted (via g1/g2). This delay can vary. It possesses a constant fundamental value which is determined by the device. However, the time of this delay can also increase, and indeed as a result of interference, thus in the event of an operational failure or an operational error.

The sum of all of the delays between the time slot of the frame mark bit transmitted from the time slot stage Z2 and the time slot of the frame mark bit received from the time slot stage Z1—and, as represented above, originating therefrom—can assume a minimum value and a maximum value. These delays assume the minimum value when both the line trunk group in question is entirely free of shortcomings and is operating free of interference, and the TDM line g1/g2 and e in question exhibit the shortest cable length occurring in the exchange. The delays assume the maximum value and both the trunk group in question is subject to shortcomings or is operating with interference within permitted boundary values as regards the resultant delay influence, and also the TDM lines possess the longest cable length occurring in the exchange.

In order that, as stated, the switching network K may operate with equal pulse frame boundaries in its various switching stages, it must be ensured that the pulse frame boundaries of the sub-items of information received via the input E of the time slot multiple Z1 are equal in time to the pulse frame boundaries prevailing within the switching network. Two different types of measures are taken for this purpose. On the one hand, it is provided that the time slot stages, e.g. C2, provided in the last switching stage transmit the received sub-items of information which have been intermediately stored in their full memory, e.g. V2, in pulse frames whose pulse frame boundaries are displaced in respect of time slots relative to the pulse frame boundaries of the pulse frames of the subitems of information received in the relevant time slot stage, e.g. Z2, by a specific uniform delay time. The duration of this time delay is determined by the difference between the pulse frame durations, on the one hand, and, on the other hand, the sum of possible maximum values of those delays which are caused by line influences (cable transit times) on the path from the switching network output, e.g. A, to the relevant line trunk group LTG, and on the path from the line trunk group to the relevant switching network input, e.g. E, and by influences, in particular interference influences, within this device. Maximum values of delays caused by the last-mentioned influences represent, as already stated above, maximum values permitted in operation. Secondly, it is provided (according to the above discussion) that the inputs, e.g. E, of the switching network K are assigned compensating memories which serve to intermediately store the sub-items of information received by one of the line trunk groups LTG pulse frame by a pulse frame including the pulse frame boundaries, and which retransit the sub-items of information following a storage time which may be adapted to the difference between the maximum value and the actual value of the aforementioned line influences and the aforementioned influences within the device in question. These two measures ensure that the sum of the aforementioned delays is supplemented by the aforementioned uniformly-set specified delay time (caused by the time slot stage Z2 of the last switching stage) and the storage time which may be adapted to the prevailing operating conditions (intermediate storage in the compensating memory G) with the target of thereby increasing these delays to a total delay amounting to one pulse frame, whereby the requisite equality of the pulse frame boundaries is achieved. Advantageously, the additional delays which may supplement the aforementioned delays (up to a total delay amounting to the duration of one pulse frame) are implemented only partially by the compensating memory G and also partially by the time slot stage of the last switching stage, and, in fact, to the extent of the minimum value of these additional delays which may require to be added (minimum value so that the maximum value of the total delays occurring on the TDM line e and g1/g2 and in the line trunk group is compensated, i.e. is filled to a pulse frame duration). Therefore, the storage capacity of the compensating memory G can be contrived to be considerably less, therefore, economizing considerably in expense. Its storage capacity need only match the longest storage time bridging the difference between the aforementioned maximum value and the aforementioned minimum value.

The specified delay time set to remain uniform in the time slot multiples of the last switching stage (in accordance with the first of the measures described above) can, in this exemplary embodiment, be brought about in a different manner. For example, it is possible, at the end of the write-in process, described earlier herein, of the items of switching data obtained by path hunting into a holding memory, to take into account the requisite delay time. The addresses of the storage units of that full memory from which the sub-items of information which have been intermediately stored for TDM switching purposes are read in accordance with these addresses for their retransmission, are written into the holding memory which is, in fact, being cyclically read with a delay corresponding to the above delay time. Therefore, the full memory position addresses are not written into the storage positions of the holding memory in accordance with the holding memory position addresses obtained by the path hunting, but—assuming continuously-numbered holding memory positions—in accordance with holding memory position addresses which are obtained by adding a numerical value corresponding to the aforementioned delay to the holding memory position addresses obtained by the path hunting. If this addition produces a sum which exceeds the number of sub-items of information per pulse frame (this number corresponds to the number of channels on the TDM line), then this number is deducted from the obtained sum. This delay concerns not only the sub-items of information, but also the frame mark bit which occurs at the beginning of the pulse frame. Consequently, the frame mark bit is transmitted with a delay corresponding to the aforementioned delay time.

In this respect, for completeness, it should be added that those sub-items of information in a case of which the addition of the numerical value corresponding to the delay to the holding memory position address obtained by the path hunting produces a sum exceeding the number of sub-items of information per pulse frame, and in the case of which the last-mentioned number is deducted from this sum, are transmitted in accordance with the full memory position addresses stored in the first storage positions of the holding memory. These sub-items of information are in advance of the other sub-items of information by one pulse frame. However, this is of no practical significance since the sequence of the sub-items of information within a pulse frame—i.e. the channel assignment to the individual connections—does not thereby undergo any change.

The specified delay time set to be uniform for the time slot stages of the last switching stage (in accordance with the first of the above-described measures) can, in this described exemplary embodiment, also be achieved at various other ways than detailed above, e.g. by corresponding delay at the time of the write-in of the sub-items of information into the full memory. It is equally possible to carry out the writein of the sub-items of information into the full memory of the time slot multiple Z2 in accordance with the items of information stored in the holding memory and to read-out the sub-items of information from the full memory in a cyclic manner; in this case, the possibility exists of implementing the above-mentioned delay of a pulse frame boundaries corresponding to the invention by the aforementioned delay time in that the measure suitable to achieve this delay are taken at the time of the cyclic read-out of the sub-items of information from the full memory.

As regards the compensating memories, e.g. G, it has already been described above that the inputs, e.g. E, of the switching network K are assigned compensating memories which intermediately store the sub-items of information received by one of the line trunk groups pulse frame by a pulse frame including the pulse frame boundaries and which retransmit the sub-items of information following a storage time which can be matched to the difference between the maximum value and the actual value of the aforementioned line influences and the aforementioned influences within the device in question. For this purpose, the compensating memory G can, for example, contain a shift register X into which the sub-items of information including the pulse frame recognition bits are written pulse frame-by-pulse frame and from which they are later read out accordingly. For this purpose, it can be provided that, in order to match the storage time in the described manner, the time difference between the time slot of the pulse frame recognition word relating to the sub-items of information arriving via the TDM line component g1 relative to the time slot of the pulse frame recognition word of the sub-items of information to be forwarded via the TDM line component g2 (that is the time slot of the pulse frame recognition word in the switching network K in general terms) is measured, and that in accordance with this time difference the sub-items of information to be entered in the compensating memory, including the frame recognition word, are fed to a shift register component which is designed to be such that the shift register component which serves to output the shift register contents is preceded by a number of shift register components corresponding to the requisite storage time. In order that the previously-described functions may be put into practice, the compensating memory G can contain a measuring device M which measures the time difference between the time slot of the pulse frame boundaries of the pulse frames of the sub-items of information received via the TDM line component g1 relative to the time slot of the pulse frame boundaries in the switching network K (the information in question is received by the measuring device M from the switching network K via the current path t). In accordance with this measurement, in the compensating memory G a write-in control device x is set to that number of the shift register components $x1, x2, \ldots xn$ of the shift register X, e.g. to the shift register component $x4$, in the case of which the above requirement is fulfilled under the prevailing operating conditions.

Compensating memories are also provided in the line trunk groups LTG. These serve to produce synchronism in respect of time slots and pulse frame boundaries between the sub-items of information which arrive from the switching network in the duration of transmission or the corresponding sub-items of information which are to be forwarded to the switching network via the particular other channel of the pair. These compensating memories, like the above-described compensating memory G, can be constructed not only as shift registers, but also with the aid of a full memory in which a write-in device operates with a lead, corresponding to the above measurement result, relative to a read-out device in that the read-out process to be carried out for each of the full memory components takes place with a delay relative to the corresponding write-in process.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for time division multiplex telecommunications exchanges, in particular pulse code modulation telephone exchanges, in which individual connections are each established via a pair of channels, the two individual channels of which serve to transit items of communication relating to the connection in the one transmission direction and in the other transmission direction, and in which line devices are individually connected to the inputs of a multi-stage switching network which includes an incoming time slot stage, an outgoing time slot stage and a space slot stage connected between said time slot stages, and in which the two channels which are to be switched through via the switching network in accordance with the time division multiplex principle and which are each assigned to a connection exhibit synchronism in respect of clock rate and pulse frame boundaries by virtue of intermediate storage of the items of communication information to be transmitted in each of the two directions of transmission, in which the write-in and read-out processes in the full memories of each of these devices are brought into synchronism in respect of the time sequence of the individual sub-items of information and the time of the pulse frame boundaries of the pulse frames which combine the sub-items of information scanning cycle-by-scanning cycle, and in which the two channels which are switched through by time division multiplex and are each assigned to a connection are subject to delay influences in their course from one of the devices via the switching network back to the same or to another corresponding device operating in synchronism therewith in respect of clock rate and pulse frames, which delay influences affect the time sequence of the individual sub-items of information and the time slot of each of the pulse frame boundaries, and in which delay devices are provided via which the channels may be switched through by time division multiplex and which effect an additional delay by which the sub-items of information which arrive from the switching network via a channel of a pair of channels assigned to a connection in the device or the corresponding sub-items of information which are to be forwarded to the switching network via the other channel of the pair are brought into synchronism with respect of their time slots and the boundaries of their pulse frames in order to assure the above-mentioned synchronism, the improvement therein comprising:

means in said time slot stages in the last switching stage operable to transmit the received sub-items of information which have been intermediately stored in the respective full memory in pulse frames whose boundaries are displaced in respect of time slots relative to the pulse frame boundaries of the pulse frames of the sub-items of information received in the time slot stage by a delay time whose duration is determined by the difference between the pulse frame duration and the sum of possible maximum values of those delays which are caused by line influences on the path from the switching network output to the device in question and on the path from this device to the relevant switching network input, and by influences, in particular interference influences, within this device; and compensating memories assigned to the inputs of the switching network for intermediately storing the sub-items of information received from one of the aforementioned devices pulse frame-by-pulse frame including the pulse frame boundaries and operable to retransmit the sub-items of information following a storage time which may be matched to the difference between the maximum value and the actual value of the aforementioned line influences and the aforementioned influences within the device in question.

2. The improved circuit arrangement of claim 1, wherein each of said compensating memories comprises:

a shift register, including shift register components, into which the sub-items of information, including the pulse frame mark bits are written pulse frame by pulse frame and from which they are read out at a later time;

measuring means operable, in order to match the storage time, to measure the time difference between the time slot of the pulse frame mark bits of the sub-items of information arriving in the compensating store in question relative to the time slot of the pulse frame mark bits in the switching network is measured; and means operable in accordance with this time difference to feed the sub-items of information to be written into the compensating memory, including the frame mark bit, to a shift register component which precedes the shift register component which serves to output the shift register contents by a number of shift register components corresponding to the requisite storage time.

3. The improved circuit arrangement as claimed in claim 1, wherein each of said compensating memories comprises:

a full memory; and further comprising a write-in device and a read-out device, said write-in device operable with a lead in relation to said read-out device in that the read-out process to be carried out for each of the full memory components which takes place with a delay relative to the corresponding write-in process corresponding to a time difference; and means for determining the time difference as the difference between the time slot of the pulse frame mark bit of the sub-items of information arriving in the compensating memory relative to the time slot of the pulse frame mark bit in the switching network.

* * * * *